April 21, 1959 — M. W. GREENE ET AL — 2,882,719
APPARATUS FOR FLUID ANALYSIS
Filed Jan. 6, 1955 — 2 Sheets-Sheet 1
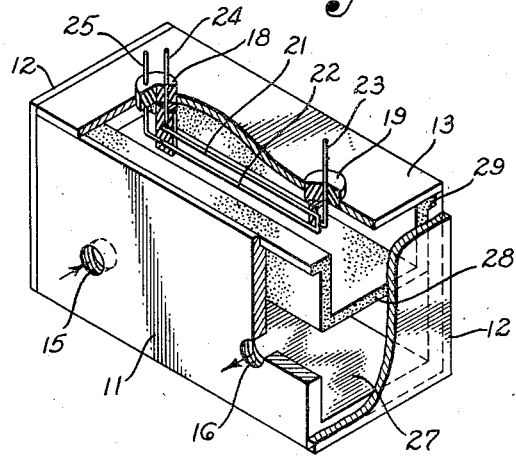
Fig.1.
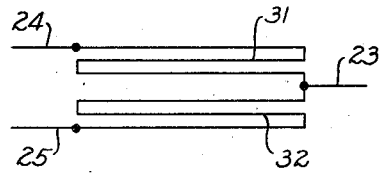
Fig.2.
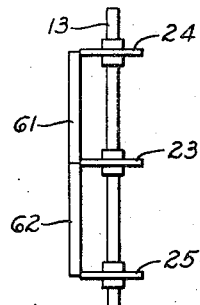
Fig.3.
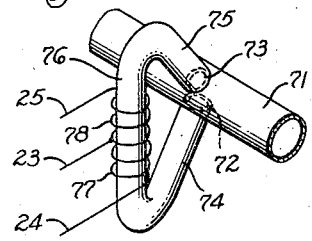
Fig.4.
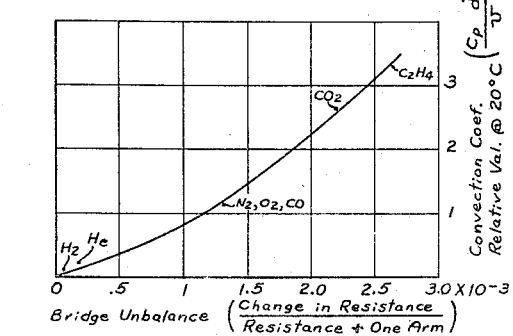
Fig.7. Carbon Dioxide Determination In Oxygen-Nitrogen Mixtures
This Point = 10.65% CO₂ In 85.80% N₂ 3.55% O₂
0.3 Watt – 73°C
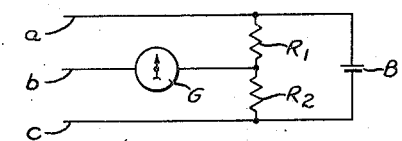
Fig.5.
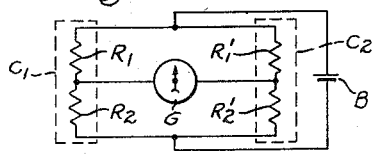
Fig.6.
Fig.8.
INVENTORS.
MALBONE W. GREENE
LOUIS THAYER
BY THEIR ATTORNEYS.
HARRIS, KIECH, FOSTER & HARRIS April 21, 1959  M. W. GREENE ET AL  2,882,719
APPARATUS FOR FLUID ANALYSIS
Filed Jan. 6, 1955  2 Sheets-Sheet 2
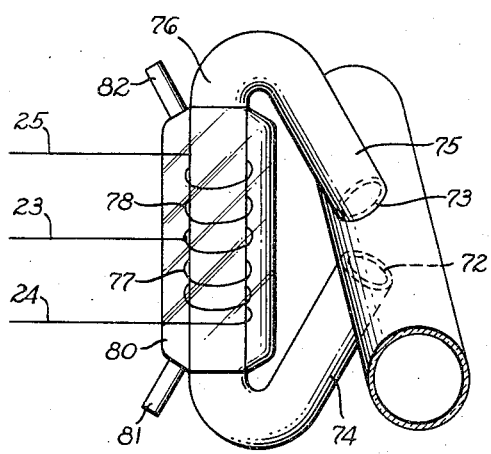
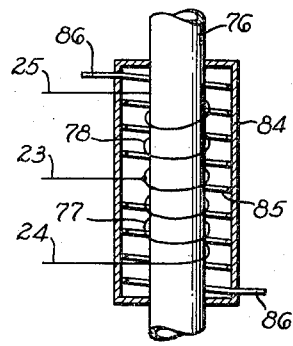
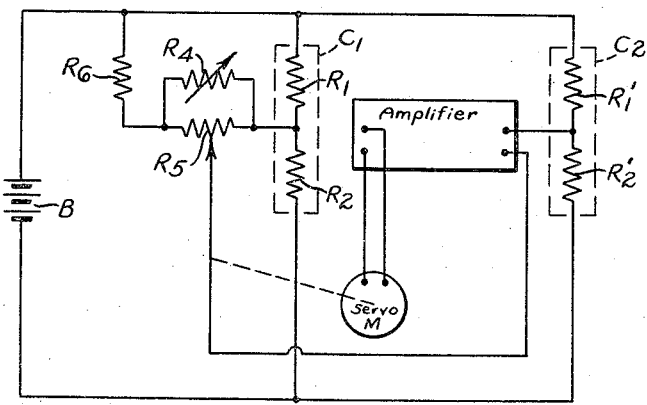
INVENTORS.
MALBONE W. GREENE
LOUIS THAYER
BY THEIR ATTORNEYS.
HARRIS, KIECH, FOSTER & HARRIS United States Patent Office 2,882,719
Patented Apr. 21, 1959

2,882,719

APPARATUS FOR FLUID ANALYSIS

Malbone W. Greene, Pasadena, and Louis Thayer, Duarte, Calif., assignors, by mesne assignments, to Beckman Instruments, Inc., Fullerton, Calif., a corporation of California Application January 6, 1955, Serial No. 480,148

4 Claims. (Cl. 73—27)

The present invention relates to apparatus for the analysis of fluids.

It has been known for many years that gas mixtures can be satisfactorily analyzed by measuring the thermal conductivity of such mixtures. In many of these prior procedures, the amount of heat conducted away from a hot electrical element in an unknown gas mixture is compared with the amount of heat conducted away from a second hot electrical element in a known gas or gas mixture, and, by virtue of this comparison, the analysis of the unknown gas mixture is made. In general, the amount of heat conducted from each element in a gas mixture in this type of measurement is measured utilizing the change in resistance of the two elements by virtue of the change in temperature. These changes in resistance are, in turn, measured by means of a common Wheatstone bridge type electrical circuit.

As nearly as can be determined, all of the prior procedures of this type rely principally upon the conduction as opposed to the removal of heat away from the heated element by means of thermal convection. It is customary to employ various specialized constructions in such gas analysis apparatus in order to prevent the presence of convection currents around the heated elements because transfer of heat by convection has been considered undesirable. Such transfer of heat in this manner is generally considered in the art to prevent accurate heat conductivity measurement. However, in prior art devices of the class broadly described above, both conduction and convection of heat away from such heating elements have occurred, and, invariably, efforts have been made to balance out the effect of convection currents by means of special circuits and cell constructions.

The present invention differs from these prior devices in that it is predicated upon the discovery that the removal of heat by convection currents provides a very efficient and accurate means for determining the composition of most fluid mixtures. It is a broad object of the instant invention to teach a method utilizing such convection currents in order to determine the composition of a fluid mixture. A further object of the invention is to provide new apparatus which can be used to carry out the instant invention. Other objects of the present disclosure and many advantages of it will be apparent from the remainder of this specification and the appended claims.

The invention may be briefly summarized as embodying apparatus in which two temperature-sensitive resistance elements are placed one above another within means defining a segregated fluid chamber so that a fluid flows by thermal convection upwards from the first of these elements past the second, causing a temperature differential to arise between the two elements, which temperature differential can be measured by common electrical apparatus, such as, for example, a Wheatstone bridge, so as to indicate the composition of the fluid mixture. The heat required in such apparatus in order to give rise to the thermal convection necessary may either be supplied by these resistance elements, or by means of various external heating means, as will be more fully described. The invention may also be briefly summarized as involving a method in which a fluid is heated adjacent a first electrical resistance element and is caused to flow by virtue of the heat so as to conduct heat from adjacent the first of these elements upwards to a second electrical resistance element, and in which the temperature differential between the two heating elements is determined in order that the composition of the fluid mixture may be deduced. The invention is, of course, more precisely summarized by the appended claims forming a part of this specification. Further details of it will be apparent from the remainder of this description, the claims, and the accompanying drawings, in which:

Fig. 1 illustrates an isometric, partially sectional view of a new apparatus of the invention;

Fig. 2 diagrammatically illustrates a modified apparatus of the invention;

Fig. 3 diagrammatically illustrates a second modified apparatus of the invention;

Fig. 4 diagrammatically illustrates a third modified apparatus of the invention;

Fig. 5 shows an electrical measuring circuit used with any of the apparatus falling within the scope of the disclosure;

Fig. 6 shows a second electrical measuring circuit utilized with the invention;

Figs. 7 and 8 are analysis curves used with the invention;

Fig. 9 diagrammatically illustrates a fourth modified apparatus of the invention;

Fig. 10 diagrammatically illustrates part of a fifth modified apparatus of the invention; and Fig. 11 shows an electrical measuring circuit which may also be employed with any of the apparatus herein disclosed.

For convenience, like numerals are used to designate like parts in all figures of the drawings.

A prime advantage of the instant invention lies in the fact that individual fluids which differ slightly in their heat conduction coefficients may differ widely in their convection coefficients. Furthermore, some fluids commonly encountered in mixtures have nearly identical convection coefficients, making possible the determination of a component fluid which has a different convection coefficient in a multicomponent fluid mixture. For example, oxygen, nitrogen, carbon monoxide, and water vapor have approximately the same convection coefficients, while that of carbon dioxide is approximately twice as great. Inasmuch as the convection coefficients for various fluids vary differently with temperature, it is possible to employ the presently described method at an optimum temperature for any given mixture at which the convection coefficients of the background fluids are most nearly equal. For these reasons, analyses may be made with the present invention that could not be made satisfactorily with the prior apparatus for measuring heat conductivity. The present invention may also be used together with heat conductivity or other measurements in order to obtain a composite analysis of multicomponent gas or liquid systems.

These convection coefficients referred to above can be calculated approximately from the formula $$\frac{C_p d^2}{v}$$

where $C_p$ is the isobaric heat capacity per unit weight, $d$ is the density of the fluid, and $v$ is the coefficient of viscosity of the fluid. This formula can be derived from a consideration of the forces tending to move a unit volume of fluid in proximity to a heated vertical surface. When the apparatus is operated at elevated temperatures, the coefficients calculated by the above procedure no longer apply; however, the measurements obtained permit measurement of fluid composition by the general procedure herein described.

The present invention is of particular applicability for the analysis of respiratory products or the analysis of products of combustion inasmuch as the convection coefficient for carbon dioxide is considerably different from that of either nitrogen or oxygen. The herein described method and apparatus are relatively insensitive to the presence of large amounts of water vapor such as are encountered in the human breath. Because all of the usual components of combustion products, except carbon dioxide, have approximately the same convection coefficients, the herein-described process and apparatus are effective for the analysis of gases of this type.

Perhaps the invention will be best understood if reference is made to the devices shown in the accompanying drawings. In Fig. 1 there is shown a device used in carrying out the method of the present invention consisting of a U-shaped center block 11 capped on opposed ends by end caps 12 and at the top by means of a lid 13. Within one wall of the center block 11 there are positioned tapped inlet and outlet openings 15 and 16 respectively leading to a center cavity 27. Within the lid 13 there are positioned two insulating bushings 18 and 19 carrying at their lower extremities electrical heating rods 21 and 22 which are joined beneath the bushing 19 in a common junction. This junction is connected externally of the device by a wire lead 23 projecting through the bushing 19; the other ends of the rods are connected externally of the device by means of wire leads 24 and 25 projecting through the bushing 18. Both the heating rods 21 and 22 have approximately the same resistance and are positioned parallel to one another. Within the center block 11 these heater rods are segregated from the cavity 27 by means of a porous screen 28 resting upon shoulders 29 within the center block 11 adjacent the lid 13. This screen is preferably formed of a porous gas-permeable material such as, for example, porous carbon or sintered ceramic frit or the like. The ends of the screen 28 preferably contact the caps 12, effectively sealing the heating rods 21 and 22 from the balance of the cavity 27.

An appropriate electrical measuring circuit for use with the apparatus illustrated in Fig. 1 is shown in Fig. 5 as consisting of an electrical lead $a$ connected to a resistor $R_1$, which is connected to a second resistor $R_2$, fastened to an electrical lead $c$. A battery B is connected across these resistors, and an electrical lead $b$ containing a galvanometer G is connected to the junction between the resistors $R_1$ and $R_2$, as indicated.

In using the device shown in Fig. 1, the leads $a$, $b$ and $c$ are connected to the leads 24, 23 and 25. As this occurs, current flows from the battery B, heating the rods 21 and 22. An unknown gas or gas mixture or liquid or liquid mixture is then passed through the cavity 27 by means of the inlet 15 and the outlet 16. A small portion of this fluid diffuses through the screen 28 into contact with the heating rods 21 and 22. At the lower of these rods, the fluid is heated by contact and thus is caused to flow upward past the second rod. The difference in the temperatures of these rods caused by this fluid flow is measured by means of the galvanometer G, which may, if desired, be calibrated to read the convection coefficient of the fluid within the cavity 27 directly. It will be realized that this type of measuring circuit is that commonly known as a "Wheatstone" bridge circuit. Various conventional modifications can be made with this circuit; thus a sliding bridge arrangement can be substituted for the galvanometer G, and other current sources besides a battery can be used.

In using the device, fluid from around the heating rods 21 and 22 diffuses out through the screen 28 at the same rate at which fluid diffuses in through the screen 28 into contact with these rods. A screen of the type illustrated is normally employed in order to prevent flow, other than that due to thermal convection, in the vicinity of the resistance elements. It will be realized that such screens may be dispensed with when the design of any specific construction is such that there is no extraneous flow past the heating elements. Thus, such screens may be completely dispensed with when a given quantity of fluid is held immobile within an analysis apparatus.

The two heating rods shown in Fig. 1 can be satisfactorily replaced as shown in Fig. 2 by two flatly disposed heating coils 31 and 32 connected to terminal leads 24 and 25 and a center lead 23. The use of heating coils of this type permits greater heating action than could normally be obtained with small rods of the type illustrated in Fig. 1. With both of the heater constructions shown in Figs. 1 and 2, the heating elements must be positioned one above the other.

It is also possible to replace the heating elements 21 and 22 shown in Fig. 1 by resistance rods 61 and 62 as is shown in Fig. 3 of the drawing connected by means of appropriate leads 23, 24 and 25 as described above into a Wheatstone bridge type of circuit. Rods of this category must be placed in position parallel to the direction of gravity in order that the convection of heat upward can occur from the bottom heating element 62 to the top one 61. This can be achieved by reconstructing the construction shown in Fig. 1 in a vertical direction if desired. Other equivalent means such as resistance coils can be used instead of the rods 61 and 62.

A number of other devices can be used within the scope of the invention in order to satisfactorily determine the convection coefficient of fluid mixtures. One such device is disclosed and claimed in the copending application of Ray I. Wilson, Serial No. 380,303, filed September 15, 1953, entitled "Gas Analysis Cell," and is shown in Fig. 4 of the drawings herein as consisting of a horizontally disposed flow tube 71 which is designed to carry a stream of fluid and has on opposed sides openings 72 and 73 leading to side passages 74 and 75, repectively, these passages being connected to an analysis tube 76 around which there are disposed windings 77 and 78 in the form of coils which are adapted to be used to measure a convection coefficient in substantially the manner described above. In utilizing this construction, fluid is passed through the flow tube 71 and a small amount of this fluid diffuses through the openings 72 and 73 down into the analysis tube 76 where, by virtue of the fact that heated fluids tend to rise, convection currents are set up as indicated above. The resistance windings 77 and 78 disposed around the analysis tube 76 are connected to a conventional Wheatstone bridge construction, as shown in Fig. 5, by means of leads 23, 24 and 25, in the same manner in which the resistance elements indicated in Fig. 1 of the drawings were similarly connected to a bridge.

The construction shown in Fig. 9 of the drawings is essentially similar to that illustrated in Fig. 4, except for the inclusion within this construction of a heating jacket 80 disposed about the analysis tube 76. This jacket is provided with a conventional inlet 81 and an outlet 82 so that fluid may be circulated within it in order to either heat or cool the contents of the analysis tube 76. The use of such means for altering the temperature of the contents of the analysis tube is frequently desirable when the apparatus is employed with fluids at either extremely high or low temperatures. In Fig. 10 of the drawings, another construction which is related to Fig. 4 of the drawings is shown. Here there is illustrated an anlysis tube 76 as employed in Fig. 4, around which there is disposed a housing 84 containing on its inner surface an electrical heating element 85 connected in the exterior of the housing 84 by means of leads 86. Preferably, the interior of the housing 84 is formed having a reflective surface.

The operation of the constructions illustrated in Figs. 9 and 10 of the drawings is essentially identical with the operation of the construction shown in Fig. 4. These two figures are employed, however, to illustrate the fact that with the present invention it is possible to separate the heating used to give rise to convection currents in carrying out the method of the present invention and the means employed to determine the presence of a temperature differential. Within the constructions Figs. 9 and 10, the heat necessary to give rise to the convection currents used is supplied either by a fluid flowing through the heating jacket 80 or by means of the electrical heating element 85. The temperature differential caused by means of such convection currents is measured through the aid of the windings 77 and 78 substantially as indicated in the preceding discussion.

Those skilled in the art will realize that various equivalent means of the type broadly pictured in Figs. 1 through 4, and 9–10 of this application may be employed, and that it is comparatively immaterial with respect to the process of this application whether a screen or a hollow tube is used to segregate the fluid being measured from a main flow stream. Further, those skilled in the art will realize that the heating and sensing functions may be separated in constructions of the broad category shown in Fig. 1 in a similar manner in which these functions are separated in the constructions shown in Figs. 9 and 10 of the drawings. A condition which must be met in all cases is that there is no externally induced flow past the two sensing elements employed which would give rise to unwanted movement of fluid past the sensing elements; that is, the fluids analyzed must in all constructions be free to travel by means of convection from one sensing element upward past a second.

In Fig. 6 of the drawings there is shown an electrical circuit for a device which can be used to compare the convection coefficients of two fluids. This device consists essentially of two cells $C_1$ and $C_2$ of any of the types previously described or indicated in the specification. Both of these cells, however, are preferably of the same construction. Each of them contains resistances $R_1$, $R_1'$, $R_2$ and $R_2'$ of the type previously described. These resistances are connected at their extremities by means of an appropriate battery B so as to be in parallel. Their midpoints are connected as shown with a galvanometer G which may be calibrated to read directly any changes in resistance within either of the cells $C_1$ or $C_2$. If desired, a potentiometer can be substituted for the calibrated galvanometer. If it is desired to employ a balanced bridge method of detection, it is advantageous to interchange the battery and galvanometer leads. It is to be understood that this type of circuit broadly is known to the art. In using the device shown in Fig. 6, a known gas or liquid is introduced into one of the cells, say cell $C_2$ and an unknown gas or liquid is introduced into the cell $C_1$. The difference in the convection coefficients of the two gases or liquids is readily apparent by the change in the reading of the galvanometer G. With an arrangement of this type a first order compensation for changes in temperature, power supply voltage, barometric pressure, etc., is automatically obtained.

In Fig. 11 of the drawings, another electrical circuit is shown for a device which can be used to compare the convection coefficients of two different fluids. This construction consists essentially of two cells $C_1$ and $C_2$ of any of the types previously described or indicated in this specification. Both of the cells are, of course, preferably of the same construction, and contain resistances $R_1$, $R_2$, $R_1'$, and $R_2'$ of the type described connected at their extremities as shown to an appropriate battery B so as to be parallel with this battery. The junction of the resistances $R_1$ and $R_2$ is connected to a sliding resistor $R_5$ and to a variable resistor $R_4$, as indicated, these latter two resistors being parallel with one another so that the terminal junction remote from the cell $C_1$ is connected through a resistor $R_6$ to a terminal lead going to the battery B. The resistor $R_5$ is connected as shown to an amplifier, and is adjusted by means of a servomotor, as indicated in the drawings, so that any variation in the voltage drop across the cells $C_1$ and $C_2$ is picked up by means of this amplifier causing an adjustment of the resistor $R_5$. Preferably, the servomotor is connected to a recording device so that the difference in convection coefficients of the fluids within the cells $C_1$ and $C_2$ may be directly determined. The amplifier shown is connected to the junction of the resistances $R_1'$ and $R_2'$ in the cell $C_2$ as shown. The actual operation of the circuit shown in Fig. 11 is considered to be obvious to those skilled in the art, and is essentially similar to the operation of the circuit shown in Fig. 6.

Those skilled in the art will realize that the herein described and disclosed invention is capable of wide modification. Such modifications are to be considered as part of the instant inventive concept insofar as they are defined in the appended claims. In order that this disclosure may be complete under the Rules of Practice in the United States Patent Office, the following specific example is given:

In carrying out the process of the invention, an apparatus as illustrated in Fig. 4, utilizing a center tapped platinum winding as heating element, is connected to a Wheatstone-bridge type apparatus, as indicated in Fig. 5, in which the battery supplies a current of 160 milliamps. at 1.8 volts to the platinum windings having a resistance at 20° C. of approximately 5 ohms each. Various gases at 20° C. were passed through the apparatus and the bridge unbalance; that is, the change in resistance of the windings divided by the resistance of one winding, was plotted against the convection coefficient of these gases, as calculated from the formula given earlier in the specification. This plot is shown in Fig. 8 of the drawings. It was then possible to determine by extrapolation the percentage of an ingredient in a two-component gas mixture by extrapolation between the bridge unbalance for each of the individual components of this mixture and the bridge unbalance of the unknown mixture. This broad method was satisfactorily used in determining the percentage of carbon dioxide in air-carbon dioxide combustion mixtures by determining the change in bridge unbalance between that normally apparent for nitrogen, oxygen and carbon monoxide, as indicated in Fig. 8, and that for carbon dioxide as indicated in this figure.

For use in determining the carbon dioxide content of respiratory gases, known mixtures of carbon dioxide and air were passed through the apparatus described above and the resistance change divided by the resistance of one of the windings was plotted against the percentage of carbon dioxide in order to obtain the plot shown in Fig. 7. Unknown mixtures of carbon dioxide and air were then passed through the apparatus and from the resistance change divided by the resistance of one arm it was possible to directly determine the percentage of carbon dioxide in the unknown mixture by the use of this curve.

The procedures indicated in the preceding paragraphs were also carried out using other fluids, including water and glycerin mixtures, water and ethyl alcohol mixtures and water and methyl alcohol mixtures. Satisfactory analyses were obtained by this procedure. The results obtained in all curves agreed with results obtained by other methods of analysis.

We claim as our invention:

1. In an apparatus for measuring the thermal convection coefficient of fluid, the combination of: means defining a fluid chamber; diffusion screen means positioned within said chamber, said diffusion screen means separating said chamber into a first zone, and a second zone located above said first zone; means for introducing a fluid into said first zone; a first heating element positioned at said second zone; a second heating element positioned at said second zone vertically above said first element; and means, respectively responsive to the temperatures of said elements, for measuring the difference in temperature between said first and second elements.

2. An apparatus for measuring the thermal convection coefficient of a fluid, which comprises: means defining first and second fluid chambers, said second chamber being positioned above said first chamber; porous screen means positioned between said chambers permitting diffusion of a fluid from said first chamber to said second chamber; means for admitting and withdrawing fluid to and from said first chamber at a single level; first and second temperature sensitive electrical resistance means positioned one above the other within said second chamber; electrical leads connected to said first and second resistance means; means supplying power to said resistance means; and means for measuring the difference in the resistances of said first and second resistance means.

3. A device as defined in claim 2, wherein said resistance means comprise collinear rods.

4. A device as defined in claim 2, wherein said resistance means comprise parallel heating elements.

References Cited in the file of this patent

UNITED STATES PATENTS

| 2,603,965 | Medlock | July 22, 1952 |
| 2,693,103 | Krupp | Nov. 2, 1954 |

FOREIGN PATENTS

| 834,604 | Germany | Mar. 20, 1952 |

OTHER REFERENCES

Article: "Thermal Conductivity Bridge for Gas Analysis," by C. Minter and L. Burdy, published in Analytical Chemistry, vol. 23, pages 143–7; January 1951.

Article by F. W. Pritchard, published in "Journal of Scientific Instruments," vol. 24, No. 4, April 1952, pages 116, 117.